(12) United States Patent  
Hakkani-Tur et al.

(10) Patent No.: US 8,024,190 B2  
(45) Date of Patent: *Sep. 20, 2011

(54) SYSTEM AND METHOD FOR UNSUPERVISED AND ACTIVE LEARNING FOR AUTOMATIC SPEECH RECOGNITION

(75) Inventors: Dilek Zeynep Hakkani-Tur, Morris Plains, NJ (US); Giuseppe Riccardi, Hoboken, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 31 days.

This patent is subject to a terminal disclaimer.

(21) Appl. No.: 12/414,587

(22) Filed: Mar. 30, 2009

(65) Prior Publication Data

US 2009/0198493 A1 Aug. 6, 2009

Related U.S. Application Data

(63) Continuation of application No. 10/742,854, filed on Dec. 23, 2003, now Pat. No. 7,533,019.

(51) Int. Cl.
*G10L 15/04* (2006.01)
(52) U.S. Cl. .................. 704/252; 704/244; 704/243
(58) Field of Classification Search .................. 704/231, 704/235, 236, 243, 244, 251, 252, 255
See application file for complete search history.

(56) References Cited

OTHER PUBLICATIONS

Giuseppe Riccardi and Dilek Hakkani-Tur, "Active and Unsupervised Learning for Automatic Speech Recognition", In the Proceedings of EUROSPEECH 2003, $8^{th}$ European Conference on Speech Communication and Technology, Geneva, Sep. 2003.
Dilek Hakkani-Tur, Giuseppe Riccardi, Allen Gorin, "Active Learning for Automatic Speech Recognition," In the Proceedings of International Conference on Acoustics, Speech and Signal Processing (ICASSP 2002), May 2002.
Gokhan Tur, Robert E. Schapire and Dilek Hakkani-Tur, "Active Learning for Spoken Language Understanding", In the Proceedings of ICASSP-2003, International Conference on Acoustics, Speech and Signal Processing, Hong Kong, Apr. 2003.
Roberto Gretter and Giuseppe Riccardi, "On-Line Learning of Language Models with Word Error Probability Distributions," in Proc. of the IEEE International Conference on Acoustics, Speech and Signal Processing, 2001.
Dilek Hakkani-Tur and Giuseppe Riccardi, "A General Algorithm for Word Graph Matrix Decomposition," In the Proceedings of ICASSP-2003, International Conference on Acoustics, Speech and Signal Processing, Hong Kong.
Gokhan Tur, Dilek Hakkani-Tur and Robert E. Schapire, "Active and Semi-Supervised Learning for Spoken Language Understanding," Aug. 2003.

*Primary Examiner* — Huyen X. Vo

(57) ABSTRACT

A system and method is provided for combining active and unsupervised learning for automatic speech recognition. This process enables a reduction in the amount of human supervision required for training acoustic and language models and an increase in the performance given the transcribed and un-transcribed data.

19 Claims, 4 Drawing Sheets

SYSTEM AND METHOD FOR UNSUPERVISED AND ACTIVE LEARNING FOR AUTOMATIC SPEECH RECOGNITION

PRIORITY

This application is a continuation of U.S. patent application Ser. No. 10/742,854, filed Dec. 23, 2003, the contents of which is incorporated herein by reference in its entirety.

BACKGROUND OF THE INVENTION

1. Field of the Invention

The present invention relates generally to speech recognition systems and, more particularly, to an unsupervised and active learning process for automatic speech recognition systems.

2. Introduction

State-of-the-art speech recognition systems require transcribed utterances for training of various knowledge sources, such as language and acoustic models, used in the speech recognition system. In general, acoustic models can include the representation of knowledge about acoustics, phonetics, microphone and environment variability, gender and dialect differences among speakers, etc. Language models, on the other hand, can refer to a system's knowledge of what constitutes a possible word, what words are likely to co-occur, and in what sequence. The semantics and functions related to an operation a user may wish to perform may also be necessary for the language model.

Many uncertainties exist in automatic speech recognition (ASR). For example, uncertainties may relate to speaker characteristics, speech style and rate, recognition of basic speech segments, possible words, likely words, unknown words, grammatical variation, noise interference, and normative accents. Each of these uncertainties can be the cause in the reduction of recognition success in an ASR system. A successful speech recognition system must therefore contend with all of these issues.

A speech recognition system generally seeks to minimize uncertainties through the effective training of the system. As noted, this training is based on the generation of transcribed utterances, a process that is labor intensive and time-consuming process. As would be appreciated, if issues of cost were ignored, more effective speech recognition systems could be created through the use of greater amounts of transcribed data. This does not represent a practical solution. What is needed therefore is an efficient mechanism for creating a quality speech recognition system using all available sources of training data, whether existing in transcribed or un-transcribed form.

SUMMARY

In accordance with the present invention, a process is provided for combining active and unsupervised learning for automatic speech recognition. This process enables a reduction in the amount of human supervision required for training acoustic and language models and an increase in the performance given the transcribed and un-transcribed data.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
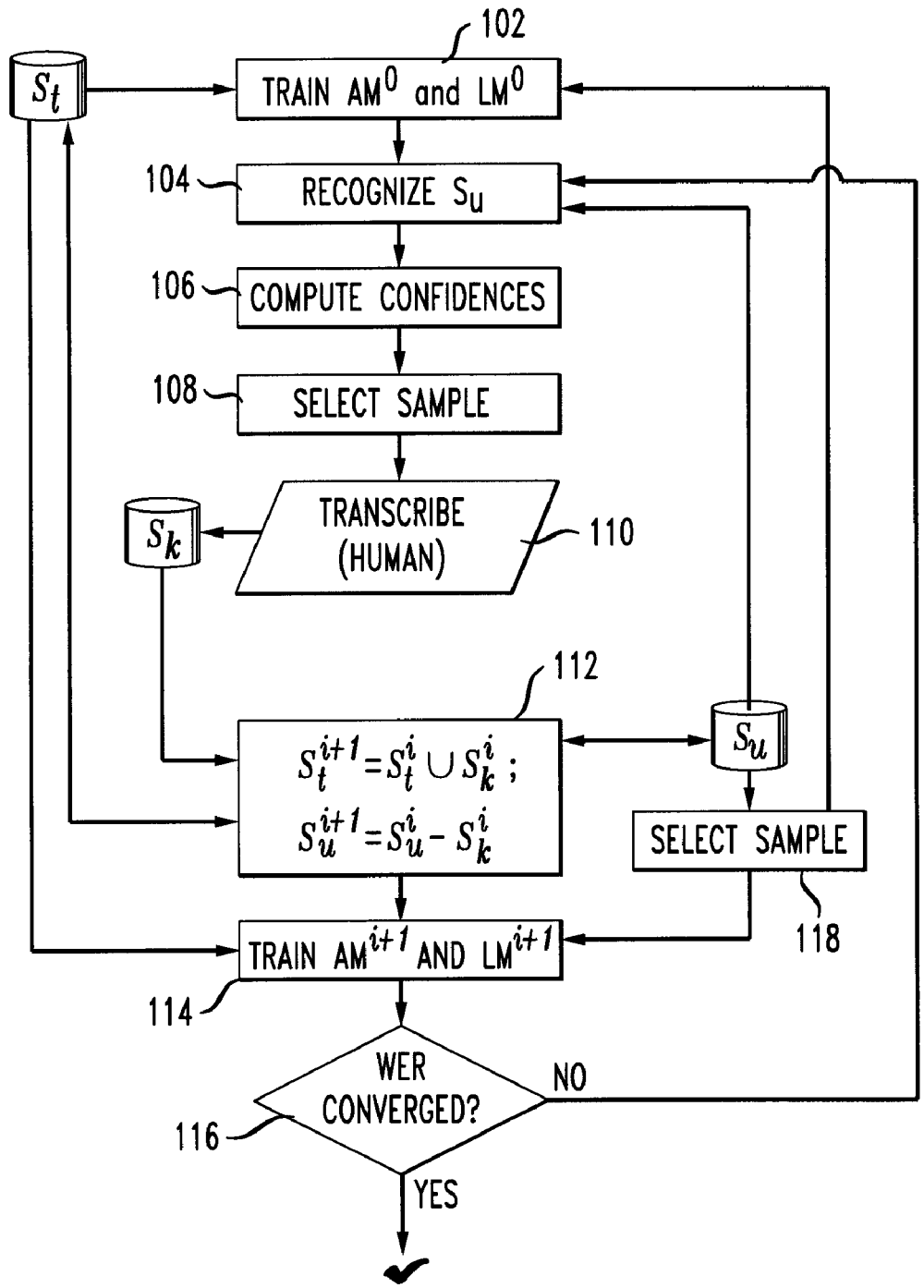
FIG. 1 illustrates an exemplary method of the present invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

As noted, state-of-the-art automatic speech recognition (ASR) systems require transcribed utterances for training. Utterances may be obtained from recorded conversations between customers and a call center. A developer or a team of developers must transcribe and label the utterances to identify user intent. Not every utterance is valuable, however. For example, if a user calls a call center to order a television, he may talk with the call center employee about the weather before saying "I'd like to order a TV."

The transcription process used to generate these transcribed utterances is labor intensive and time-consuming. One method of reducing the number of training examples to be labeled is through active learning, which inspects the unlabeled examples, and selectively samples the most informative ones with respect to a given cost function for a human to label. One of the goals of the active learning algorithm is to select the examples for labeling that will have the largest performance improvement. Another method of reducing the cost of training an ASR system is through unsupervised learning, which aims at utilizing unlabeled examples, to train, augment, or adapt the system.

In accordance with the present invention, the transcription effort for training an ASR system is reduced through the combination of active and unsupervised learning techniques. As will be described, this process uses word and utterance confidence scores for utterance selection in active learning, and probability estimation in unsupervised learning. In the description following below, the main active and unsupervised learning processes are briefly described first, followed by a description of their combination.

Active learning is generally designed to aid and automate the labor-intensive process of building and training speech recognition models. One of the goals of an active learning system is to significantly reduce the amount of transcribed data required to train ASR models with a given level of accuracy. This reduction in transcribed data will ultimately reduce the cost and time-to-market for natural language services.

In the active learning process, a speech recognizer is first trained using a small set of transcribed data $S_t$. This small set may be manually generated from a group of utterances or automatically generated from web pages related to the application domain. Using the recognizer, the system recognizes the utterances that are candidates for transcription Su, where $S_u$ is an additional un-transcribed set. Using lattice-based confidence measures, the system predicts which candidates are recognized incorrectly. The human transcriber then transcribes the utterances that are most likely to have recognition errors.

In unsupervised learning, one of the goals is exploiting un-transcribed data to either bootstrap a language model or in general improve upon the model trained from the transcribed set of training examples. In other words, the model trained from the transcribed set of training examples is augmented using machine-labeled data rather than human-labeled data.

FIG. 1 illustrates an embodiment of a combined unsupervised and active learning process for automatic speech recognition. As illustrated, the process begins at step 102 through the training of the initial acoustic and language models AM' and LM' for recognition using a small set of transcribed data $S_t$ and also possibly a set of available un-transcribed utterances. Here, the variable "i" is the iteration number, and as shown in step 102, i=0 for the initially trained acoustic and language models AM' and LM'. Next, at step 104, the utterances in set $S_u$ are recognized using the trained acoustic and language models. At step 106, the confidence scores are computed for all of the words or un-transcribed utterances. Before continuing with the flow chart of FIG. 1, the calculation of confidence scores will be discussed.

Confidence scores can be calculated in various ways. In a first embodiment, confidence scores are calculated based on acoustic measurements. In a second embodiment, confidence scores are calculated based on word lattices. The second embodiment has the advantage that the probability computation does not require training of an estimator. As would be appreciated, hybrid approaches that use features of these two embodiments can also be used.

In accordance with the present invention, word confidence scores are extracted from the lattice output of the ASR system. In general, the word confidence score extraction process comprises: computing the posterior probabilities for all transitions in the lattice; extracting a path from the lattice (which can be the best, longest or a random path, which path is called the pivot of the alignment); traversing the lattice; aligning all the transitions with the pivot; and merging the transitions that correspond to the same word (or label) that occur in the same interval (by summing their posterior probabilities). A detailed explanation of this process and the comparison of its performance with other approaches is presented in Hakkani-Tur et al., A General Algorithm for Word Graph Matrix Decomposition, Proceedings of ICASSP, Hong Kong, April 2003, which is incorporated by reference herein in its entirety.

The state times or approximate state locations on the lattice are used to align transitions that have occurred at around the same time interval. The final structure is called a pivot alignment. The word posterior probability estimates on the best path of the pivot alignments are used as word confidence scores, $c_i$.

For active learning, different approaches were evaluated to obtain utterance level confidence measures from word confidence scores that are extracted from ASR lattices. One approach is to compute the confidence score of an utterance as the arithmetic mean of the confidence scores of the words that it contains:

$$c_{,,} = \frac{1}{n} \sum_{} lc_i \qquad \text{(Equation 1)}$$

Another approach is to compute the confidence score of an utterance as the product of the confidence scores of the words that it contains:

$$c_{,,} = \prod_{l=1} lca^{(c_i)} \qquad \text{(Equation 2)}$$

where $a_i(14)_i$ is a scaling function. Other functions can also be used to compute the utterance confidence scores:

$$c_{w,\cdot} = F(c_{,,}, \ldots, c_n) \qquad \text{(Equation 3)}$$

where F can be the geometric mean or the min function.

Returning to the flowchart of FIG. 1, after the confidence scores are computed at step 106, k utterances are selected, at step 108, that have the smallest confidence scores from $S_u$. Next, at step 110, the k selected utterances are transcribed by human effort. At step 112, the new k selected utterances that are transcribed and denoted by Sk, are added to the transcribed set $S_t$ (i.e., $S, I+1 = ^S U$ Ski), while also being subtracted from the set of available utterances $S_u$ (i.e., $S'7^1 = S_u^1 - S_k^i$). The new set of training data $S; +_1$ can then be used to train the new acoustic and language models $AM'^{\pm 1}$ and $LIV1^{1+1}$ at step 114.

As illustrated, the additional un-transcribed set $S_u$ is made available to the ASR system processing at steps 104 and 112. The initial transcribed set $S_t$ is also made available to the initial training step 102, recalculation step 112, and training step 114.

At step 116, a determination is also made as to whether the word accuracy (WER=word error rate) has converged. If it is determined that the word accuracy has not converged, then the process loops back to step 104. If it is determined that the word accuracy has converged, then the process ends as further transcription is not expected to improve ASR performance. The process can be repeated again later, as new un-transcribed data from the domain becomes available.

As further illustrated in FIG. 1, un-transcribed data $S_u$ can also be used to train the acoustic and language models $AM'^{i+1}$ and $LM'^{\pm 1}$ at step 114. More specifically, the ASR output and word confidence scores for un-transcribed data are used to train, augment, or adapt the ASR system. As illustrated in FIG. 1, in one embodiment, only a selected sample (chosen at step 118) of un-transcribed data are used to train, augment, or adapt the ASR system. This element of unsupervised learning is therefore used in combination with the active learning process described above.

Figure 2:
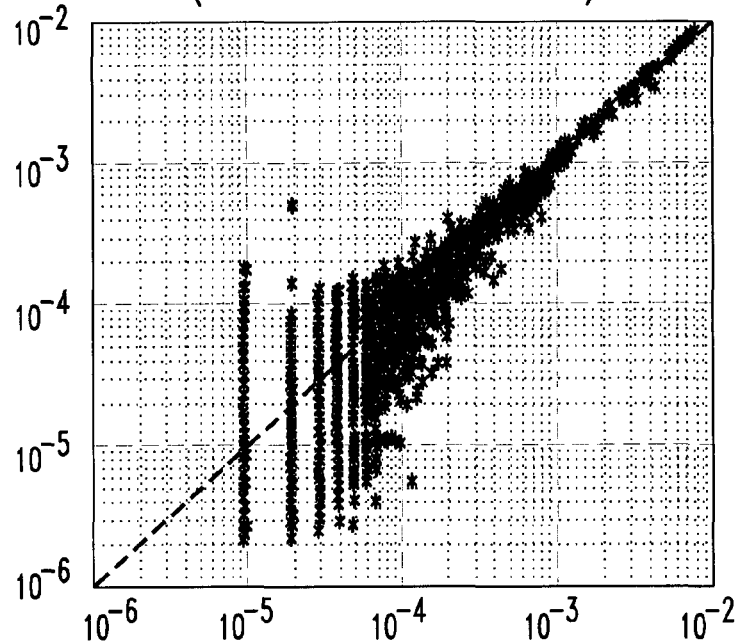
FIG. 2 illustrates a scatter plot of n-gram probabilities estimated from clean vs. noisy speech utterance transcriptions.

One issue with unsupervised learning is the estimation of the error signal. In the case of language modeling the error signal is the noise on the event counts. Even in the simple case of n-gram language modeling the n-gram counts in the presence of noise are very unstable. FIG. 2 illustrates a scatter a plot of n-gram probabilities as estimated from clean (true)

transcriptions of speech (x axis) and estimated from noisy transcriptions (y axis), in this case the ASR output. As illustrated, FIG. 2 shows how the error variance increases for infrequent n-grams.

In standard n-gram estimation the occurrences of n-tuples $C(w_i^n)$ are counted, where $w_i^n$ is the word n-tuple $w_i, w_{23} \ldots w_n$. In unsupervised learning the nature of the information is noisy and n-gram counts are estimated from two synchronized information channels, the speech utterance hypothesis and the synchronized error signal. For each word $w_i$, the probability of being correctly decoded $c_i$ ($=1-e_i$, where $e_i$ is the error probability) is estimated, resulting in the confidence score. The bidimensional channel is then represented as a sequence of n-tuples of symbol pairs $(w_i^n, c_i^n) =$ (wi,c 1)(w2,c2), ..., (wn,cn). The n-gram counts in presence of noise can be computed by marginalizing the joint channel counts:

$$CuL(w_i') = c_x \delta_{\cdot 4}, (x) \quad \text{(Equation 4)}$$
$$xET$$

where $c_x$ is the confidence score for the n-tuple x in the noisy spoken utterance transcriptions T and $\delta_{\cdot i}(x)$ is the indicator function for the n-tuple $w_i^n$. The confidence score of the n-tuple $w_i^n$ can be computed by geometric or arithmetic means or max and min over the n-tuple of word confidence scores $c_i^n$. In one embodiment, the simplest approach is taken where $c_{x4} = c_{12}$ is computed. Equation 4 can be rewritten as a function of the error probability $e_n$:

$$C_{UL}(W_1^i) = C(W_i^n) - 0_4(x) \quad \text{(Equation 5)}$$
$$xET$$

Equation 5 shows the relation between the count estimates with and without error signal $Cu_L(w,")$ and $C(w_i^n)$, respectively.

A series of experiments verified that word confidence scores can be used to identify correctly recognized words, utterance confidence scores can be used to select more informative utterances to transcribe, and automatic speech recognition accuracy can be improved by exploiting un-transcribed data. For all these experiments, utterances from AT&T's How May I Help You?$^{SM}$ (HMIHY) speech database was used. See A. Gorin et al., "Semantic Information Processing of Spoken Language, In Proc. of ATR Workshop on Multi-Lingual Speech Communication. 2000, which is incorporated herein by reference in its entirety. The language models used in all experiments were trigram models based on Variable Ngram Stochastic Automata. See G. Riccardi et al., "Stochastic Automata for Language Modeling," Computer Speech and Language, 10:265-293, 1996, which is incorporated herein by reference in its entirety.

In the HMIHY speech database there were two distinct data collections. The first is from human-human conversations (8K utterances and 300K word tokens) and consists of responses to the initial prompt. The second is from human-machine dialogs (28K and 318K word tokens) and consists of users' responses to all system prompts (e.g. greeting and confirmation prompts). The test data consists of 1,000 utterances (10K words) from the human-machine data collection. All experiments kept the acoustic model fixed, and used a model, which is subword unit based, with triphone context modeling, and trained using utterances from human-human conversations, and other telephone speech. The training data for the acoustic model did not overlap with the additional training data.

Figure 3:
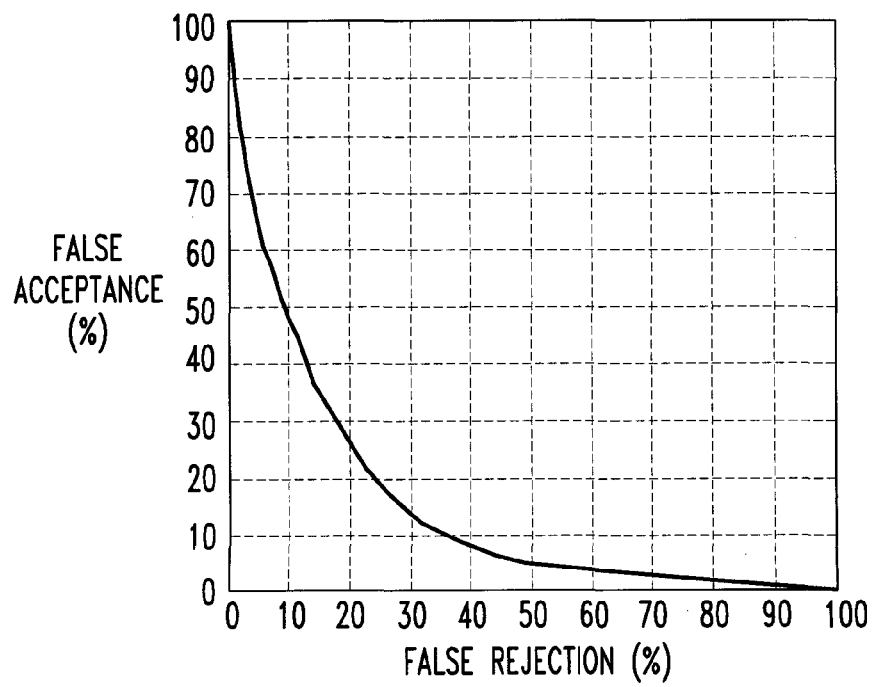
FIG. 3 illustrates the false rejection rate versus false acceptance rate.

The language model that was used was trained using all the human-human utterances to recognize the test data, and computed word confidence scores for the ASR output. The word accuracy of the test set was 63.8%. To check how good the word confidence scores were in distinguishing the correctly recognized and misrecognized words, a binary classification problem was considered, where the confidence scores of the words was used, as well as a threshold for the decision. Each word was classified as correctly recognized if that word had a confidence score higher than the threshold, and as misrecognized otherwise. False rejection and false acceptance rates were computed by changing the threshold and comparing the classifications with the references (see FIG. 3). False rejection rate is the percentage of correctly recognized words that are classified as misrecognition, since their confidence score is lower than the threshold. False acceptance rate is the percentage of misrecognized words that are accepted as correct recognitions, since their confidence score is higher than the threshold. On the test set, the equal error rate (False Rejection Rate equals False Acceptance Rate) is 22%.

Figure 4:
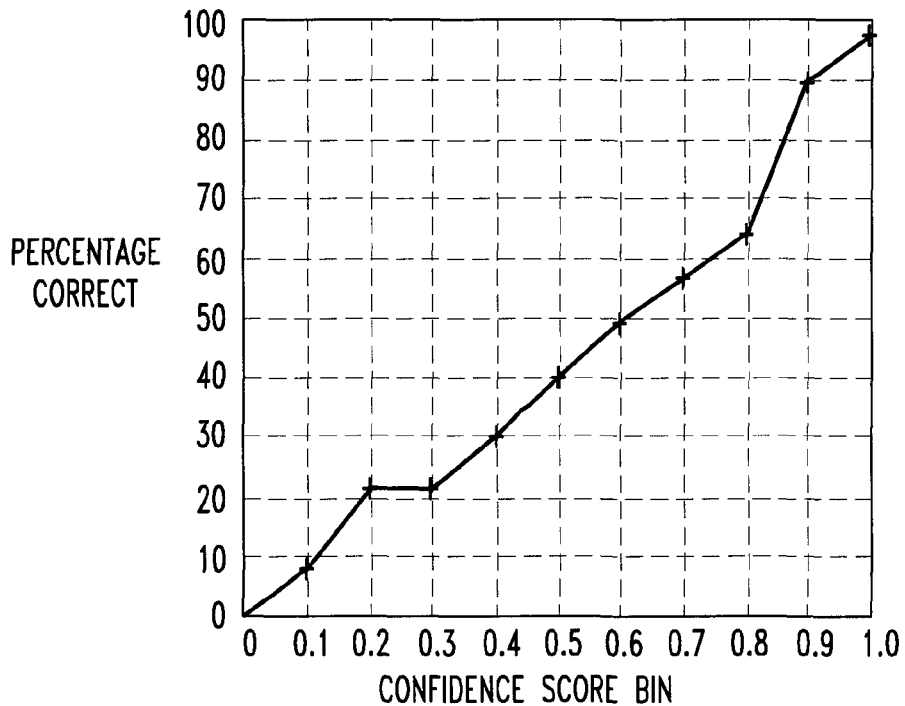
FIG. 4 illustrates the percentage of correctly recognized words in confidence score bins.

Alternatively, FIG. 4 also plots the percentage of correctly recognized words in confidence score bins. As illustrated, for example, 8.1% of the words that have a confidence score in the interval [0.1,0.2] are correct recognitions, and the rest are misrecognitions. One may expect k % of the words having the confidence score of k/100 to be correct. As seen, the percentage of correctly recognized words in each confidence score bin increases almost linearly as the confidence score increases.

Figure 5:
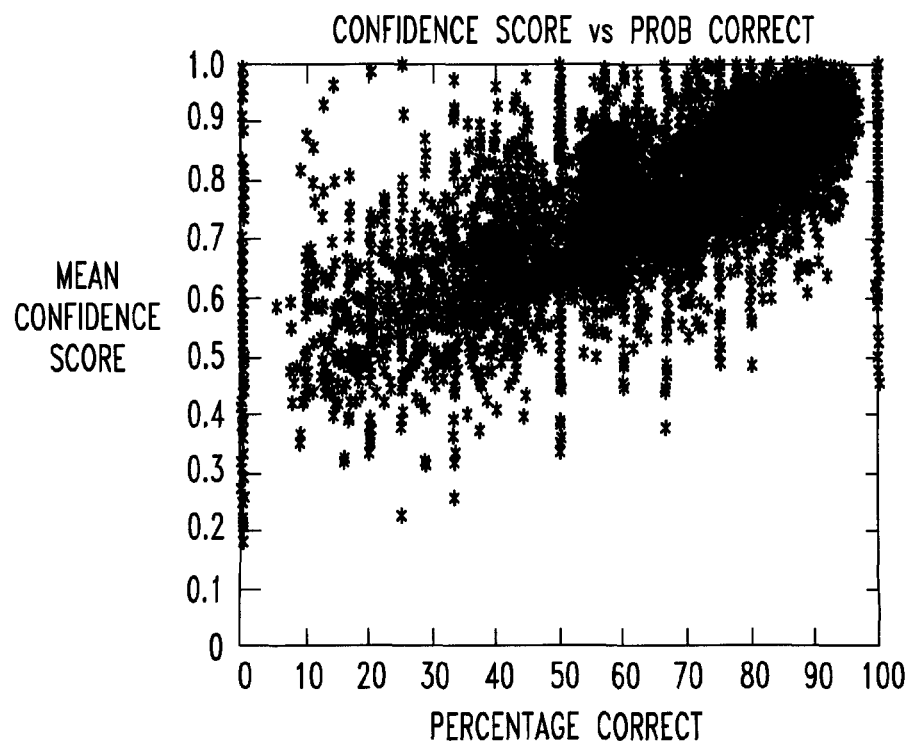
FIG. 5 illustrates the percentage of correctly recognized words in confidence score bins.

Utterance confidence scores are computed from word confidence scores for selectively sampling the utterances. FIG. 5 shows a scatter plot of utterance confidence score versus the percentage of correctly recognized words in that utterance. As illustrated, as the confidence score of the utterances increase, the percentage of correctly recognized words also increase, showing that good quality utterance confidence scores can be computed using word confidence scores.

To show the effectiveness of the estimates of the noisy counts n-gram language models were trained to run large vocabulary speech recognition experiments. A baseline stochastic language model (SLM) was trained from 1K clean human-human speech transcriptions (baseline) and then augmented with 20K noisy transcriptions with and without error signal (ASR output and Confidence Scores). Table 1 shows the Word Accuracy (WA) results on 1K test set taken from the HMIHY database. Using the counts estimated using equation 5 a 30% reduction of the gap between the baseline and supervised SLM (Upper bound) was achieved without requiring further transcription of speech utterances.

TABLE 1

| Training Set | WA |
| --- | --- |
| Baseline | 59.1% |
| ASR output + baseline | 61.5% |
| ASR output + Confidence Scores + baseline | 62.1% |
| Upper bound | 69.4% |

Figure 6:
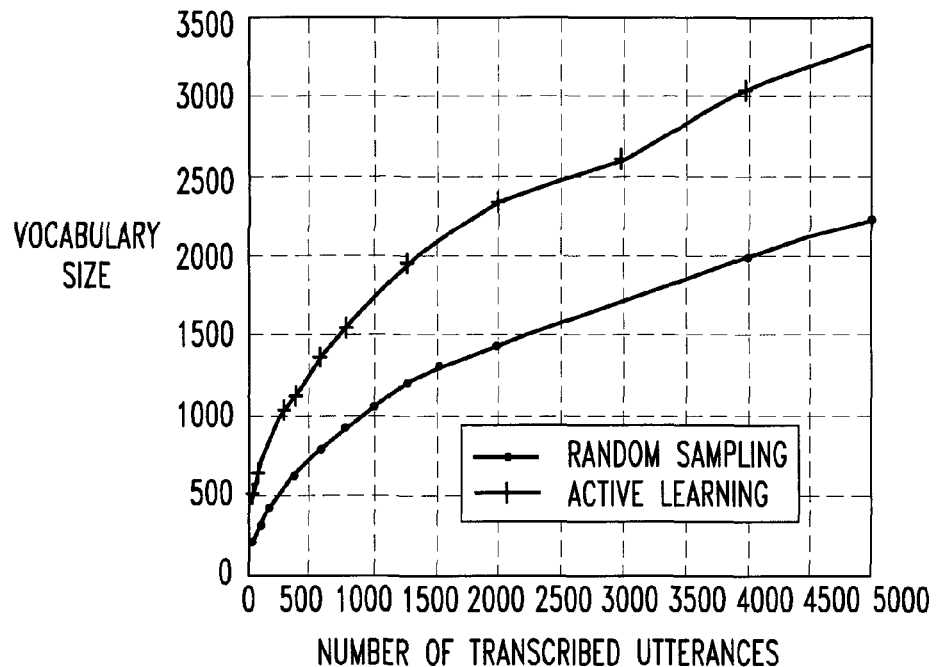
FIG. 6 illustrates the vocabulary size growth with random and selective sampling.

For active learning in ASR, an initial language model was trained using the initial set utterances from human-human interactions. Using this model, lattices and pivot alignments were then generated for the additional training data, and the confidence scores for words and utterances were then computed. Using the confidence scores for utterances, the utterances were then sorted in an order according to "usefulness" for ASR (generating the selectively sampled order). The language models were incrementally trained by using the top n utterances from the randomly sampled and selectively sampled orders, and learning curves were generated for word accuracy and vocabulary size (See FIGS. 6 and 7). The experiments used the arithmetic mean of the word confidence scores (i.e., F is the mean function in equation 3) as utterance confidence scores, which gave the best results. The active learning process is independent of the way the confidence scores are computed. In the experiments, the normalized utterance likelihood was also used as a sampling criterion, and it gave inferior performance.

Figure 7:
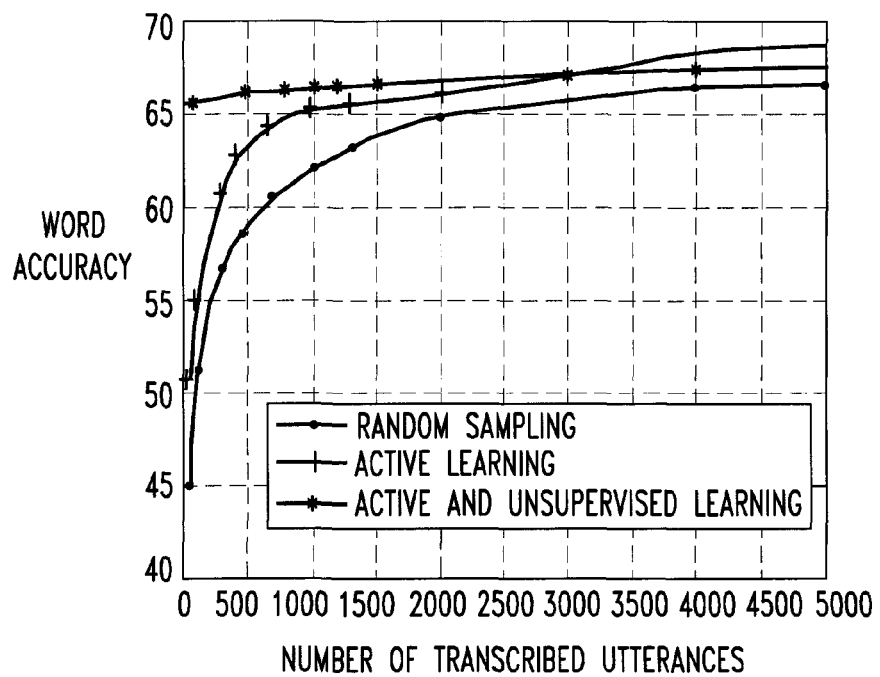
FIG. 7 illustrates word accuracy learning curves.

FIG. 7 also shows a learning curve when active and unsupervised learning are combined. For this curve, transcriptions of the top n utterances were added to the selectively sampled order, and the automatic speech recognizer output of the rest of the utterances to the training set for the language models. The recognizer output was generated using the initial language model, and contained word confidence scores. FIG. 7 shows the word accuracy learning curves when additional un-transcribed data was exploited by combining active learning with unsupervised learning.

These curves illustrate that active learning is effective in reducing the need for labeled data (for a given word accuracy). For example, to achieve 66.5% word accuracy with random sampling, transcriptions for 4,000 utterances were needed, however, this accuracy can be achieved by transcribing only around 2,500 utterances. This shows that the same performance is achieved by transcribing 38% fewer utterances, when active learning is used. In addition, a huge improvement is obtained using the un-transcribed data, at the very initial points. For example, the combination of active and unsupervised learning produces a 66.5% word accuracy by using only 1,000 transcribed utterances instead of 4,000 transcribed utterances, that is 75% less utterances than random sampling. As more transcribed data is produced, the improvement using un-transcribed data gets less and active learning takes over. The combination always results in higher word accuracy than random sampling, by 2-3% points.

As thus described, new methods are provided for reducing the amount of labeled training examples by selectively sampling the most informative subset of data for transcription using lattice based confidence measures, and exploiting the rest of the data, that has not been transcribed, by using the ASR output and word confidence scores. By selective sampling using utterance-level confidence measures, the same word accuracy results are achieved using 38% less data. It has been shown that it is possible to detect utterances that have little new information when added to an initial set of utterances. In addition to this, it has been shown that it is possible to exploit the un-transcribed data, and the same word accuracy results can be achieved using 75% less data by combining active and unsupervised learning.

Using the principles of the present invention, an improved process is provided for creating an ASR module. Thus, the present invention envisions a further embodiment that includes a spoken dialog service having an ASR module generated by the principles of the present invention.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures.

Computer-executable instructions include, for example, instructions and data which cause a general purpose computer, special purpose computer, or special purpose processing device to perform a certain function or group of functions. Computer executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the preferred embodiments of the invention may be described with reference to ASR components within a spoken dialog system. However, the invention may have applicability in a variety of environments where ASR may be used. Therefore, the invention is not limited to ASR within any particular application. Accordingly, the appended claims and their legal equivalents only should define the invention, rather than any specific examples given.

The invention claimed is:

1. A method of training an automatic speech recognition module, the method comprising:
training, via a processor of a computing device, acoustic and language models using a set of transcribed data, speech recognition scores, and word confidence scores for a retrieved set of un-transcribed data, wherein the set of transcribed data, speech recognition scores, and word confidence scores is generated by steps comprising:
recognizing utterances in a set of candidates for transcription using acoustic and language models trained using an initial set of transcribed data;
computing confidence scores of the utterances;
selecting a subset of utterances that have the smallest confidence scores from the set of candidates and transcribing them into a transcribed set;
adding the transcribed set to the initial set of transcribed data to produce an updated set of transcribed data, speech recognition scores, and word confidence scores;

selecting a pre-determined amount of un-transcribed data, the un-transcribed data being associated with utterances not selected in the selecting of the subset of utterances; and applying the pre-determined amount of un-transcribed data to train the acoustic and language models; and iteratively performing the training if word accuracy has not converged.

2. The method of claim 1, the method further comprising: prior to the training, training the acoustic and language models using another set of transcribed data.

3. The method of claim 2, further comprising:

recognizing utterances in the set of candidates for transcription using the acoustic and language models.

4. The method of claim 3, further comprising:

computing by a processor confidence scores of the utterances.

5. The method of claim 4, further comprising:

selecting k utterances that have smallest confidence scores from the set of candidates and transcribing the k utterances into a first additional transcribed set.

6. The method of claim 5, wherein k is more than one.

7. The method of claim 5, wherein selecting k utterances further comprises leaving out utterances with confidence scores indicating that the utterances were correctly recognized.

8. The method of claim 5, further comprising:

adding the first additional transcribed set to the another set of transcribed data to produce the set of transcribed data.

9. The method of claim 8, further comprising:

removing the first additional transcribed set from the set of candidates.

10. The method of claim 9, wherein the retrieved set of un-transcribed data is retrieved from the set of candidates.

11. The method of claim 10, further comprising selecting a sample of un-transcribed data.

12. The method of claim 1, wherein word posterior probability estimates are used for word confidence scores associated with the utterances.

13. The method of claim 1, wherein a word is considered to be correctly recognized if the word has a confidence score higher than a threshold value.

14. A tangible computer-readable medium that stores a program which, upon execution on a processor, causes the processor to train an automatic speech recognition module, the program comprising instructions for:

training acoustic and language models using a set of transcribed data, speech recognition scores and word confidence scores for a retrieved set of un-transcribed data, wherein the set of transcribed data, speech recognition scores, and word confidence scores is generated by steps comprising:

recognizing utterances in a set of candidates for transcription using acoustic and language models trained using an initial set of transcribed data;

computing confidence scores of the utterances;

selecting a subset of utterances that have the smallest confidence scores from the set of candidates and transcribing them into a transcribed set;

adding the transcribed set to the initial set of transcribed data to produce an updated set of transcribed data, speech recognition scores, and word confidence scores;

selecting a pre-determined amount of un-transcribed data, the un-transcribed data being associated with utterances not selected in the selecting of the subset of utterances; and applying the pre-determined amount of un-transcribed data to train the acoustic and language models; and iteratively performing the training if word accuracy has not converged.

15. The tangible computer-readable medium of claim 14, the program further comprising instructions for, prior to the training, training the acoustic and language models using another set of transcribed data, recognizing utterances in a set of candidates for transcription using the acoustic and language models and computing by a processor confidence scores of the utterances.

16. The tangible computer-readable medium of claim 15, the program further comprising instructions for selecting k utterances that have the smallest confidence scores from the set of candidates and transcribing them into a first additional transcribed set, adding the first additional transcribed set to the another set of transcribed data to produce the set of transcribed data and removing the first additional transcribed set from the set of candidates and wherein the retrieved set of un-transcribed data is retrieved from the set of candidates.

17. A spoken dialog system, the system comprising:

a processor;

an automatic-speech recognition module controlling the processor to perform automatic speech recognition, the automatic speech recognition module trained using a method of training an automatic speech recognition module and stored in a memory storage device, the method comprising:

training acoustic and language models using a set of transcribed data, speech recognition scores and word confidence scores for a retrieved set of un-transcribed data, wherein the set of transcribed data, speech recognition scores, and word confidence scores is generated by steps comprising:

recognizing utterances in a set of candidates for transcription using acoustic and language models trained using an initial set of transcribed data;

computing confidence scores of the utterances;

selecting a subset of utterances that have the smallest confidence scores from the set of candidates and transcribing them into a transcribed set;

adding the transcribed set to the initial set of transcribed data to produce an updated set of transcribed data, speech recognition scores, and word confidence scores;

selecting a pre-determined amount of un-transcribed data, the un-transcribed data being associated with utterances not selected in the selecting of the subset of utterances; and applying the pre-determined amount of un-transcribed data to train the acoustic and language models; and iteratively performing the training if word accuracy has not converged.

18. The spoken dialog system of claim 17, wherein the method further comprises, prior to the training, training the acoustic and language models using another set of transcribed data, recognizing utterances in a set of candidates for transcription using the acoustic and language models and computing by a processor confidence scores of the utterances.

19. The spoken dialog system of claim 18, wherein the method further comprises selecting k utterances that have the smallest confidence scores from the set of candidates and transcribing them into a first additional transcribed set, adding the first additional transcribed set to the another set of transcribed data to produce the set of transcribed data and removing the first additional transcribed set from the set of candidates and wherein the retrieved set of un-transcribed data is retrieved from the set of candidates.

* * * * *